United States Patent [19]

Pacquet

[11] Patent Number: 4,555,985
[45] Date of Patent: Dec. 3, 1985

[54] MACHINE FOR PREPARING CULINARY SPECIALTIES IN THE FORM OF FLAT CAKES

[76] Inventor: Denis Pacquet, 17 bis Place du Gal de Gaulle, 59122 Honschoote, France

[21] Appl. No.: 573,206

[22] Filed: Jan. 23, 1984

[30] Foreign Application Priority Data

Feb. 4, 1983 [FR] France .................. 83 01987

[51] Int. Cl.⁴ .............................. A47J 37/04
[52] U.S. Cl. ........................ 99/353; 99/386; 99/389; 99/401; 99/423; 99/443 C; 99/447; 99/448; 426/512; 426/523; 426/637
[58] Field of Search ............... 426/512, 523, 637; 99/349, 352, 355, 386, 387, 389, 391, 393, 395, 397, 401, 443 C, 422, 423, 447, 448

[56] References Cited

U.S. PATENT DOCUMENTS

| | | | |
|---|---|---|---|
| 1,471,727 | 10/1923 | Gomez | 99/423 X |
| 1,869,539 | 8/1932 | Brand | 99/423 |
| 2,015,358 | 9/1935 | Brokvist | 99/423 |
| 2,201,402 | 5/1940 | Kraust | 99/355 |
| 3,257,935 | 6/1966 | Temperato | 99/395 X |
| 3,450,027 | 6/1969 | Lohr | 99/423 |
| 4,213,380 | 7/1980 | Kahn | 99/386 X |
| 4,276,465 | 6/1981 | Flavio | 99/443 C X |

FOREIGN PATENT DOCUMENTS

| | | | |
|---|---|---|---|
| 816430 | 7/1969 | Canada | 99/353 |
| 2758282 | 7/1979 | Fed. Rep. of Germany | 99/423 |
| 575077 | 7/1924 | France . | |
| 1134708 | 11/1968 | United Kingdom . | |

Primary Examiner—Billy J. Wilhite
Attorney, Agent, or Firm—Kerkam, Stowell, Kondracki & Clarke

[57] ABSTRACT

The invention provides a machine for preparing culinary specialties in the form of flat cakes, for example, potato cakes, and is characterized in that it comprises a first station for supplying to a recess in a cooking plate constituents required for cooking the cake, and means for moving the plate successively from the supply station to a plurality of other stations at which the cake is cooked on both sides and discharged from the machine.

16 Claims, 5 Drawing Figures

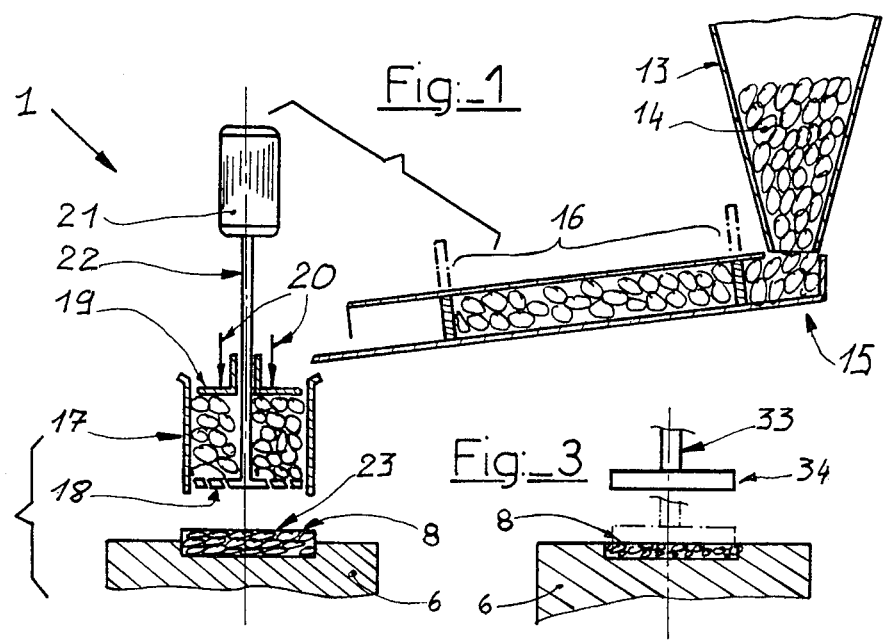
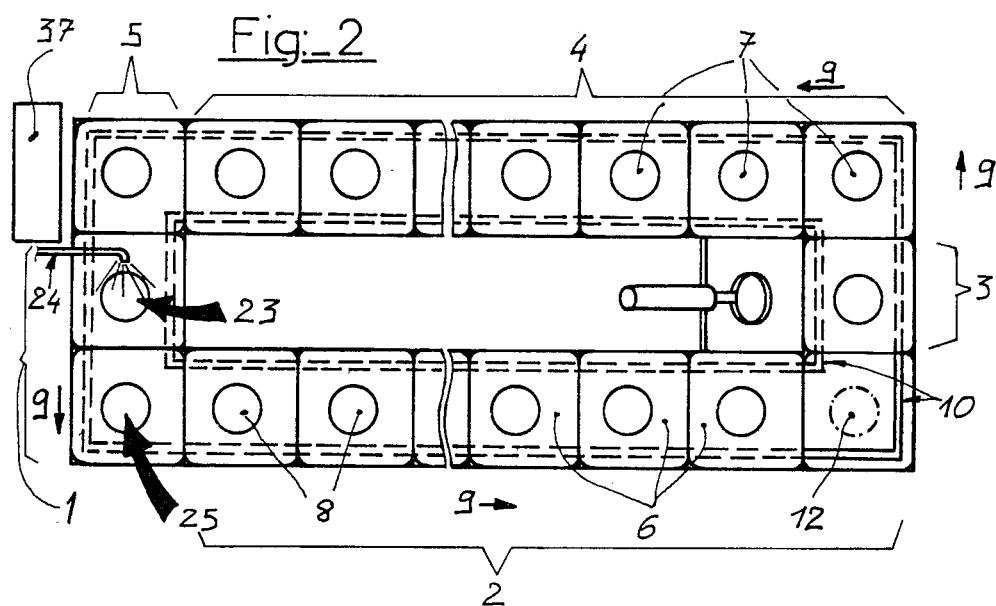

Fig._4
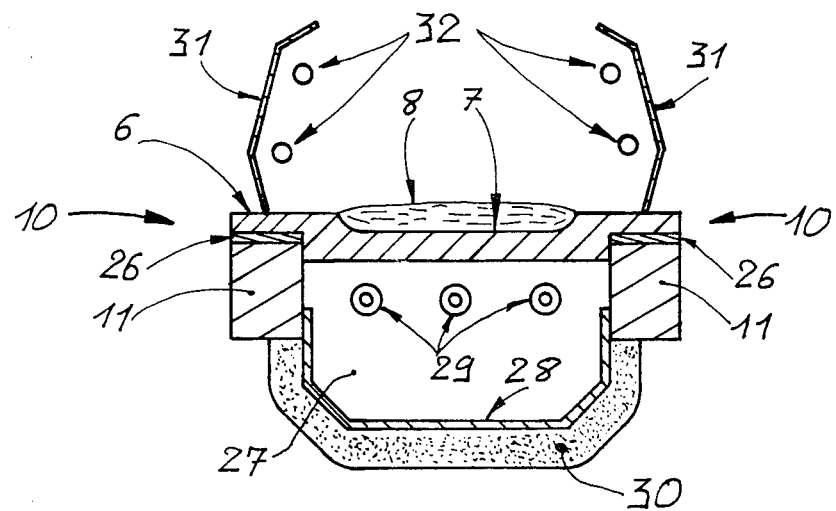
Fig._5
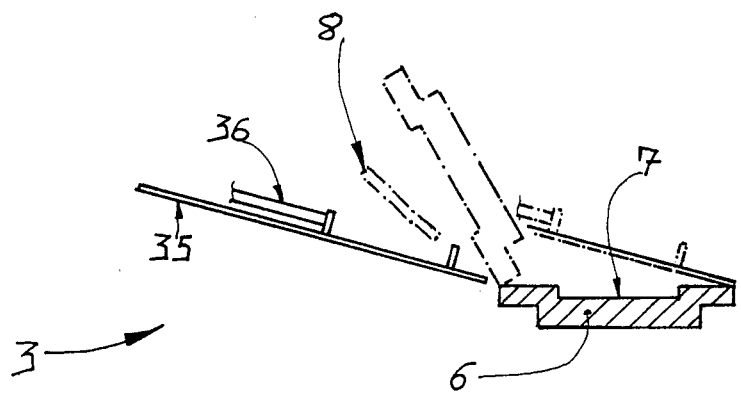

MACHINE FOR PREPARING CULINARY SPECIALTIES IN THE FORM OF FLAT CAKES

The invention relates to a machine for preparing culinary specialities in the form of flat cakes.

It finds an application more particularly, but not exclusively, in the manufacture of flat cakes from grated products for example potato cakes.

Although very much appreciated, potato cakes are, at the present time, rarely offered to customers for, because they are hand made, they take very long to prepare.

One result that the invention aims at obtaining is a machine for automating the manufacture of flat cakes.

For this, the invention provides a machine of the above mentioned type which is particularly characterized in that, to form each cake, the machine comprises, on the one hand, a recess formed in a cooking plate and, on the other hand, means for conducting the plate successively through a plurality of work stations which include:

A station for supplying the recess with products required for cooking and/or entering into the composition of the cake to be formed,
A station for cooking a first face of the cake
A station for turning the cake over,
A station for cooking its other face, and
A station for discharging the cake.

The invention will be well understood from the following description given by way of non-limiting example with reference to the accompanying schematic drawings.

FIG. 1 illustrates a supply station of the machine as,
FIG. 2 shows machine as seen from the top,
FIG. 3 shows a detail of the cooking station, and
FIG. 4 is a cross sectional view of the cooking station,
FIG. 5 shows a detail of the turning over station.

With reference to the drawings, it can be seen that, in the machine of the invention, each flat cake is formed in a recess of a cooking plate which is conducted successively, by any known means, to the different stations which the machine of the invention comprises, namely:

a station 1 for supplying products required for cooking and/or entering into the composition of the cake to be formed, then
a station 2 for cooking a first face of the cake, then
a station 3 for turning the cake over, then
a station 4 for cooking its other face and then
a station 5 for removing the cake.

To ensure good production, the machine may comprise several plates 6 and even several recesses per plate.

Each recess 7 has obviously a shape and dimension comparable to those of the flat cake 8.

In the case where the machine thus comprises several plates, they may be distributed in different numbers between the different stations as to take into account the times, which are also different, required for the work to be carried out therein.

This is why the cooking stations 2, 4, which require the longest time, are also longest in size.

Furthermore, to prevent recess 7 from emptying, the plates also have their longitudinal axis disposed substantially horizontally.

This being so, it is to limit the space occupied by the machine that the travel paths of the plates through the machine are disposed parallel to and at a small distance from each other.

So that the plates may be constantly in use, the paths through cooking stations 2, 4 are disposed in opposite directions and, between them, a junction is provided, at the front of the machine by the removal of discharge station and the supply station, and a junction is provided at the rear of the machine by the turning over station 3.

The closed circuit 9 formed by the travel paths which plates 6 then follow has advantageously a generally rectangular shape which may be situated in any plane but, in the preferred embodiment, plates 6 are all situated in the same substantially horizontal plane (FIG. 2).

However that may be, according to one feature of the invention, plates 6 all have on the edges of their lower face profiles, which at least in the cooking stations 2, 4, cooperate with slides 10 supported for this purpose by the frame 11 of the machine and by means of which the plates 6 find not only a good support but are also guided in their movement.

The dimensions of each of the sides of the rectangle which the closed circuit travel path 9 forms are determined so as to be able to receive an exact number of plates themselves rectangular and preferably square.

When positioning the plates, on at least one of the sides, at least one of the plates 6 will be omitted preferably the last one. This will allow the advance to be controlled by pushing, by a distance equal to the empty space 12 thus created, first of all at least the first one and preferably several and even all the plates which, on that side, are upstream of said empty space. This will free an equivalent space for beginning the operation again and so on for thus providing step by step feed to the different stations.

These pushing movements may for example be controlled by actuating cylinders (not shown) which, for each side of the travel path will be associated, on the one hand with frame 11 of the machine and, on the other hand, with a part (not shown) coming into abutment against the rear end of a plate or row of plates to be moved.

As mentioned earlier, each plate 6 thus passes to the different stations beginning with the supply station.

This supply station 1 (FIG. 1) comprises a storage hopper 13 for the main constituent of the flat cake 8, such as potatoes 14.

At the outlet 15 of this hopper 13 is connected a feed regulator 16, such as a chamber formed in an outlet chute.

On leaving feed regulator 16, a certain amount of said constituent 14 falls into a reservoir 17 for supplying a grater 18 of any known type.

According to one feature of the invention, there is provided, on the one hand, in reservoir 17 a bearing member 19 which, by any known means, exerts on the constituent or product 14 to be grated a force 20 such that this product 14 remains applied against the grater 18 with a constant pressure and, on the other hand, grater 18 is controlled by a motor 21 associated with a means for controlling the same intermittently for adjustable predetermined lengths of time.

The grater may, for example, be a rotary grater 18 forming the bottom of the reservoir and which is rotated by a shaft 22 passing axially through said reservoir 17 to be associated with the motor 21.

The bearing member 19 may be formed by a plate integral with a hub by which it is fitted onto a guide, such as shaft 22, which will thus ensure guiding of the translational movement thereof.

The choice of operating time for grater 18 and of said constant pressure, accurately determines the amount 23 of product 14 which is grated and delivered during each operating period of motor 21, which amount 22 will preferably correspond exactly to that to be dropped into each recess.

At the same place or at a preceding position, this recess 7 will have been sufficiently greased or oiled beforehand, for example by means of a base such as a fatty substance 24, so as to prevent the product from sticking to the bottom of the recess and so as to cook the cake 8 thereafter.

At the same place or at a subsequent position of the supply station 1, the grated product may receive other ingredients 25 such for example as spices, cheese and/or garlic and parsley.

After receiving all the chosen constituents, plate 6 leaves the supply station 1 to go to the cooking station 2 where, as mentioned above, slides 10 will guide the plate 6 in translation towards the different places it will occupy successively between the inlet and the outlet of said cooking station.

Being preferably provided with linings 26 made from a material having a low friction coefficient, these slides 10 extend parallel to the longitudinal axis of the cooking station.

According to a feature of the invention, at least in this cooking station, the machine comprises:
- on the one hand, between these slides 10, a chamber 27 defined at its lower part by an insert wall 28, fixed to the frame 11 of the machine end, at its upper part, by plates 6.
- on the other hand, housed in this chamber 27, are means 29 for heating the plates such as electric resistances or gas burner ramps.

Guiding of the plates by slides 10 will be sufficiently accurate and the facing edges of the plates will be sufficiently erect so as not to create any gap for the purpose, of course, of avoiding any heat losses.

To the same end, the external face of wall 28 defining the chamber at its lower part may be covered by a layer 30 of an insulating material such as rock wool.

Furthermore, so that the plates do not cool down on the top, on at least one of the sides of said plates, the frame of the machine has a panel 31 for insulating the cooking zone at least partially from the ambient air.

This panel 31 may also be heat insulated on its external face.

The internal face of panel 31 and/or that of wall 28 may moreover form a heat reflector.

To speed up the cooking, there may also be provided, between the internal face of panel 31 and the top of plate 6, a complementary heating means 32, for example, using infra red radiation.

According to another feature of the invention, at least at one of the places occupied successively by the plates in the cooking station, the machine comprises, connected to any known device 33 ensuring intermittent control thereof, a pressure member 34 which will urge the cake 8 against the bottom of its recess 7 so as to expel the oil therefrom which will then tend to rise up and grease the top of said cake so as to facilitate the rest of the cooking thereof.

After leaving station 2 for cooking the first face of the cake, plate 6 is conducted to station 3 for turning the cake over.

According to a feature of the invention, at this station the machine comprises on the one hand a means (not shown) associated with the plate for turning the plate over at least partially, and, on the other hand, a plate 35 associated with a means for driving plate 35 in translation between two endmost positions one position of which is situated under the recess of the upturned plate and so under the fall point of the cake which, through its own weight, escapes from its recess when the mold is turned over and a position situated above the recess of the plate when the plate is returned to its normal position.

On the top of plate 35 is provided a stop 36 which preferably surrounds the cake.

This stop is associated with a control separate from that of plate 35, so as to cause the upturned cake first of all to move with plate 35 towards the recess of the plate brought back to its normal position but which, on the contrary, as long as the cake has not fallen into the recess, will hold it above its recess at the beginning of the return of plate 35 to its waiting position for another cake where, meantime, stop 36 will join it.

After this turning over station 3, the plate reaches station 4 for cooking the second face of the cake.

Since this station is in all aspects identical to station 2 for cooking the first face, there is no need to describe it or represent it especially, it will in fact be sufficient to refer to the above description of station 2.

On leaving station 4 for cooking the second face, the plate reaches the discharge station 5 which comprises, on the one hand, a means for removing the cake, for example similar to the turning over means of station 3 and, on the other hand, a means 37 for recovering the finished cakes escaping from the overturned plate, such as a transporter and/or receptacle keeping the cake at the desired temperature.

The plate thus released may then return to the supply station 1 to begin a new cycle.

The above described machine which corresponds to a preferred embodiment may obviously undergo numerous modifications without departing from the scope and spirit of the invention.

For example, so as to limit the width of the above described assembly to that of a row of plates 6, instead of being both situated in the same horizontal plane, the two cooking stations 2 and 4 may be disposed one above the other on condition of course that the other stations are accordingly adapted for transferring the plates between these cooking stations.

This arrangement, one above the other, of the cooking stations further allows a machine to be constructed taking up little space and comprising side by side several of these assemblies thus increasing the production.

I claim:

1. A machine for preparing culinary specialities in the form of flat cakes (8) and more particularly, but not exclusively, cakes made from a previously grated product (14) such as potato cakes (8), the machine for producing each cake (8) comprising a plate (6) having a recess formed therein and means for conducting this plate successively to a plurality of stations (1 to 5), said stations comprising:
   a first station (1) for supplying the recess (7) with products (14, 24, 25) required for cooking and/or entering into the composition of the cake to be produced,
   a second station (2) having a cooking zone for cooking a first face of the cake, a third station (3) for turning the cake over, a fourth station (4) having a cooking zone for cooking a second opposite face of the cake, and a fifth station (5) for discharging the cake, the machine being characterized in that the plate follows travel paths forming a closed circuit (9) that is rectangular in shape, the travel paths to the second and fourth stations (2 and 4) for cooking the two faces of the cake (8) being disposed parallel and at a small distance from each other and also to extend in opposite directions, and in that between the paths junctions are provided at a front of the machine by the first and fifth stations and at the rear of the machine by the third station.

2. The machine according to claim 1, characterized in that it comprises a plurality of plates (6), each plate having at least one recess (7), and wherein the plates (6) are distributed in different numbers between said stations (1 to 5).

3. The machine according to claim 2, further comprising a frame (11), with support and guide slides (10), and characterized in that the plates (6) all have a first face and a second face and edges on their second face which, at least in the second and fourth stations (2 and 4), cooperate with said support and guide slides (10) of said frame (11) of the machine.

4. The machine according to claim 3, characterized in that the second and fourth stations (2, 4) have a horizontal axis and the slides (10) extend parallel to the horizontal axis, and in that the machine comprises:

between these slides (10), a chamber (27) and an insert wall (28) defining a lower part of said chamber and fixed to the frame of the machine and, said chamber has an upper part defined by the plates (6), and means (29) housed in the chamber for heating the plates.

5. The machine according to claim 2, characterized in that the frame of the machine includes a panel (31) at sides of the plates for insulating the cooking zone at least partially from the ambient air.

6. The machine according to claim 2, characterized in that the machine comprises, at a position in the second station which is occupied by a plate, a pressure member (34) which urges the cake (8) against a bottom of the recess (7), and means for controlling the pressure member intermittently.

7. The machine according to claim 2, characterized in that the plates are rectangular and the circuit (9) is situated in a substantially horizontal plane, and the dimensions of the travel paths which form the sides of the circuit are selected so as to be able to receive a predetermined number of the rectangular plates (6), at least one of the sides having a number of plates less than said predetermined number so as to create any empty space (12).

8. The machine according to claim 3, characterized in that the plates are rectangular and the circuit (9) is situated in a substantially horizontal plane and the dimensions of the travel paths which form the sides of the circuit are selected so as to be able to receive a predetermined number of rectangular plates (6) at least one of the sides having a number of plates less than said predetermined number so as to create an empty space (12).

9. The machine according to claim 3, characterized in that the first station (1) comprises a hopper (13) for storing a main constituent of the cake (8), a feed regulator (16) connected to said hopper and having an outlet for delivering a certain amount of said main constituent, a reservoir (17) into which said outlet delivers said main constituent, a grater (18) fed by said reservoir, and wherein the reservoir (17) is provided with a bearing member (19) which exerts on the main constituent a force (20) such that the main constituent remains applied against the grater (18) with a constant pressure, and comprising a motor (21) and a means for intermittently controlling the motor during an adjustable given period; and wherein the grater (18) is controlled by the motor (21).

10. The machine according to claim 3, characterized in that the frame of the machine includes a panel (31) at sides of the plates for insulating the cooling zone at least partially from the ambient air.

11. The machine according to claim 3, characterized in that, the recess (7) has a bottom and the machine comprises, at a position in the second station which is occupied by a plate, a pressure member (34) which urges the cake (8) against the bottom of the recess (7), and means for controlling the pressure member intermittently.

12. The machine according to claim 1, characterized in that the circuit (9) is situated in a substantially horizontal plane, and the dimensions of the travel paths which form sides of the circuit are selected so as to be able to receive a predetermined number of rectangular plates (6), at least one of the sides having a number of plates less than said predetermined number so as to create an empty space (12).

13. The machine according to claim 1 characterized in that the first station (1) comprises a hopper (13) for storing a main constituent of the cake (8), a feed regulator (16) connected to said hopper and having an outlet for delivering a certain amount of this constituent, a reservoir (17) into which said outlet delivers said main constituent, a grater (18) fed by said reservoir, and wherein the reservoir (17) is provided with a bearing member (19) which exerts on the main constituent a force (20) such that the main constituent remains applied against the grater (18) with a constant pressure, and comprising a motor (21) and a means for intermittently controlling the motor during an adjustable given period; and wherein the grater (18) is controlled by the motor (21).

14. The machine according to claim 1 further comprising a frame (11) having support and guide slides (10) and characterized in that the plate has a first face and a second face and edges on its second face which, at least in the cooking stations (2 and 4) cooperate with said support and guide slides (10).

15. The machine according to claim 14, characterized in that the first station (1) comprises a hopper (13) for storing a main constituent of the cake (8), a feed regulator (16) connected to said hopper and having an outlet for delivering a certain amount of said main constituent, a reservoir (17) into which said outlet delivers said main constituent, a grater (18) fed by said reservoir, and wherein the reservoir (17) is provided with a bearing member (19) which exerts on the main constituent a force (20) such that the main constituent remains applied against the grater (18) with a constant pressure, and comprising a motor (21) and a means for intermittently controlling the motor during an adjustable given period; and wherein the grater (18) is controlled by the motor (21).

16. A machine for preparing cooked food cakes comprising carrier means for successively transporting the cake to be cooked step by step through a plurality of processing stations, said carrier means including slides supporting rails and a plurality of cooking plates arranged to be slid successively on said slider supporting rails in a closed loop through the processing stations, each plate having an upper face, supply means disposed above the carrier means at a first station for supplying the cake to be cooked onto the upper face of one of said cooking plates, the upper face of each cooking plate being recessed to receive the cake to be cooked, said supply means including a hopper for storing a main constituent of the cake, a processor, and a feed regulator for connecting the hopper to the processor, said processor being disposed to cause a processed quantity of constituent to be delivered onto the recessed face of the cooking plate, greasing means disposed at said first station for greasing the recessed face of the cooking plate, seasoning means disposed at said first station for applying seasoning to the cake to be cooked, a first heating means at a second station for effecting partial cooking of the cake, said first heating means including a first chamber disposed lengthwise and beneath the rails and first heating elements within the chamber, press means at said second station for urging the cake against the cooking plate, turn-over means disposed at a third station for causing a cake to be turned over on the carrier means, said turn-over means including a reciprocal member disposed to the side of the carrier means, tipping means for raising the carrier means and causing the cake thereon to be deposited onto said member, said member being disposed and controlled such that in an extended position the cake is returned and deposited on the carrier means in a turned-over position, second heating means at a fourth station for effecting the balance of cooking of the cake, said second heating means including a second chamber disposed lengthwise and beneath the rails and second heating elements within the chamber, and a fifth discharge station for receiving the carrier means and cooked cake from the fourth station, said discharge station including discharge means for removing the cake from the carrier means.

* * * * *